(12) United States Patent
Gilbert (10) Patent No.: US 10,498,067 B2
(45) Date of Patent: Dec. 3, 2019

(54) COMPACT CONNECTOR

(71) Applicant: AXON CABLE, Montmirail (FR)

(72) Inventor: Erwan Gilbert, Epernay (FR)

(73) Assignee: Axon Cable (FR)

( * ) Notice: Subject to any disclaimer, the term of this patent is extended or adjusted under 35 U.S.C. 154(b) by 0 days.

(21) Appl. No.: 15/986,012

(22) Filed: May 22, 2018

(65) Prior Publication Data

US 2018/0366861 A1    Dec. 20, 2018

(30) Foreign Application Priority Data

May 23, 2017    (FR) ...................................... 17 54572

(51) Int. Cl.
*H01R 13/42* (2006.01)
*H01R 13/434* (2006.01)
(Continued)

(52) U.S. Cl.
CPC ......... *H01R 13/434* (2013.01); *G02B 6/3825* (2013.01); *G02B 6/3891* (2013.01); *H01R 13/422* (2013.01)

(58) Field of Classification Search
CPC .. H01R 13/434; H01R 13/422; H01R 13/426; H01R 13/514; H01R 13/506; H01R 13/4361; H01R 13/4362; H01R 13/516; H01R 13/2421; H01R 13/2428; G02B 6/3825; G02B 6/3891
See application file for complete search history.

(56) References Cited

U.S. PATENT DOCUMENTS 3,308,420 A * 3/1967 Fitz Gerald ............ H01R 33/00
439/700
4,834,487 A * 5/1989 Abendschein ....... G02B 6/3847
385/75
(Continued)

FOREIGN PATENT DOCUMENTS

CN    201 946 850 U    8/2011
CN    103 972 749 B    6/2016
(Continued)

OTHER PUBLICATIONS

French Search Report (2 pages) dated Jul. 26, 2017 for FR Application No. FR 1754572.
(Continued)

*Primary Examiner* — Edwin A. Leon
*Assistant Examiner* — Milagros Jeancharles
(74) *Attorney, Agent, or Firm* — Fay Sharpe LLP; James E. Scarbrough (57) ABSTRACT

A connector includes a housing and at least two strand fastener units for fastening strands to the connector. The housing has an internal chamber opening out into a rear face of the housing. Each of the strand fastener units has a contact and a sleeve, the contact is configured to be fastened to one end of a strand. The connector has, for each of the first and second strand fastener units, a bayonet coupling enabling at least part of the strand fastener unit to be mounted inside the internal chamber of the housing. The housing and the strand fastener units are configured so that, during mounting, the strand fastener units are inserted through a common opening into the housing.

20 Claims, 3 Drawing Sheets

(51) Int. Cl.
*G02B 6/38* (2006.01)
*H01R 13/422* (2006.01)

(56) References Cited

U.S. PATENT DOCUMENTS

| | | | | |
|---|---|---|---|---|
| 4,989,867 A | * | 2/1991 | Herrick | A63B 69/0091 |
| | | | | 473/429 |
| 5,031,981 A | * | 7/1991 | Peterson | G02B 6/3887 |
| | | | | 385/56 |
| 5,363,459 A | * | 11/1994 | Hultermans | G02B 6/3846 |
| | | | | 385/53 |
| 6,151,432 A | * | 11/2000 | Nakajima | G02B 6/3831 |
| | | | | 385/55 |
| 6,358,874 B1 | * | 3/2002 | Kobayashi | C04B 35/486 |
| | | | | 385/147 |
| 6,572,276 B1 | * | 6/2003 | Theis | G02B 6/387 |
| | | | | 385/78 |
| 7,607,929 B1 | | 10/2009 | Nguyen | |
| 7,955,142 B1 | | 6/2011 | Shuey et al. | |
| 2014/0079356 A1 | * | 3/2014 | Pepin | G02B 6/3624 |
| | | | | 385/81 |
| 2016/0139343 A1 | * | 5/2016 | Dean, Jr. | G02B 6/3869 |
| | | | | 385/78 |
| 2017/0285274 A1 | * | 10/2017 | Matsumoto | G02B 6/3821 |
| 2018/0364424 A1 | * | 12/2018 | Ott | G02B 6/3825 |

FOREIGN PATENT DOCUMENTS

DE       199 42 908 A1     6/2000
DE  10 2013 209533 A1   11/2014

OTHER PUBLICATIONS

European Search Report (8 pages) dated Oct. 11, 2018 for EP Application No. EP 18 17 3290.

* cited by examiner

COMPACT CONNECTOR

FIELD OF THE DISCLOSURE

This application claims priority from French Patent Application No. FR1754572, filed on May 23, 2017 and is incorporated herein by reference in its entirety.

The disclosure relates to a connector for connecting at least two strands to at least two corresponding strands. Each strand may have one or more electrical conductors and/or one or more optical conductors, i.e. one or more optical fibers.

More precisely, the connector constitutes a first connector that is configured so that it can itself be fastened to a second connector. Said at least two strands are fastened to said first connector and said at least two corresponding strands are fastened to the second connector. Thus, when the first and second connectors are assembled together, said at least two strands are connected together with said at least two corresponding strands.

BACKGROUND OF THE DISCLOSURE

Numerous types of connector exist for connecting strands together in the manner specified above.

In particular, there exists a connector comprising a housing and a plurality of strand fastener units. The various strand fastener units are all identical. Each strand fastener unit serves to fasten one of the strands to the housing. All of the strands are fastened to the housing via its rear face.

Thus, in order to enable strand fastener units themselves to be fastened, the housing presents opening in its rear face, i.e. as many openings as there are strands to be fastened.

Each strand fastener unit comprises a contact, a spring, and a sleeve.

The contact is an end part (or set of parts) fastened to the end of the strand for providing connection with a corresponding contact of another fastener unit with which the fastener unit under consideration is to be connected.

In the connector, considered at this point as being the "first" connector with reference to the explanation given above, the function of the contact is defined in association with the corresponding contact of the second connector: the contact is a termination part (or set of parts) that, by co-operating with the corresponding contact of the second connector, is suitable for establishing connection between the electrical or optical conductors of the strand and the electrical or optical conductors of the corresponding strand fastened to the second connector.

Within each strand fastener unit, each contact is configured to be fastened to one end of one of the strands after it has previously been passed through the sleeve, and then to be mounted or assembled in an insertion direction by passing through one of the openings in the rear face of the housing. The insertion direction is the same for all of the strand fastener units.

Connectors of that type perform the connection function in very satisfactory manner; nevertheless, they are not very compact, which can constitute a problem in certain applications.

SUMMARY OF THE DISCLOSURE

An object of the disclosure is thus to propose a connector (a "first" connector) to which a certain number of strands can be fastened so as to be connected to the same number of corresponding strands via a second connector, and which is more compact than the above-described connector.

This object is achieved by a connector comprising a housing and at least a first strand fastener unit and a second strand fastener unit, wherein:

the housing presents an internal chamber opening out via an opening in a rear face of the housing;

each of said first and second strand fastener units presents an axis and includes a contact and a sleeve, said contact being configured to be fastened to one end of a strand that has previously been passed through the sleeve;

the connector presents, for each of said first and second strand fastener units, a bayonet coupling enabling at least part of the strand fastener unit to be mounted inside the internal chamber of the housing; and the housing and said first and second strand fastener units are configured in such a manner that during mounting said first and second strand fastener units are inserted via said opening into the housing. In other words, during mounting, the first and second strand fastener units are inserted through the same opening into the housing, and thus pass through said same opening—and not through two distinct openings.

Furthermore, when the connector is assembled, the first and second strand fastener units (and possibly other strand fastener units) are placed at least in part inside the same chamber. The term "inside the same chamber" is used herein to mean that the portions of the chamber that receive those portions of the first and second contact fastener units that are inside the housing are in communication with each other, i.e. they are not entirely separated by a partition. Consequently, in mounted position in the housing, the parts of the first and the second strand fastener units which are inside the housing at least partly face each other.

Thus, the closest-together portions of the first and second strand fastener units are generally to be found facing each other directly. The first and second strand fastener units can be placed extremely close to one another.

By means of these provisions, the connector housing can be of small size, the spacing between the strand fastener units can be small, and the connector can be compact.

The above-defined connector has at least two strand fastener units and may naturally include any number of them greater than two.

The contact has the same function as the contact of the connector described above under the heading "Background of the Disclosure".

Each strand may be a strand having one or more electrical conductors and/or one or more optical fibers. Consequently, each contact may be a contact designed for one or more electrical conductors and/or one of more optical fibers.

Although only the opening of the internal chamber of the housing in the rear face is mentioned above, the internal chamber naturally also presents at least one other opening to enable the contacts of the fastener units to be connected, normally towards the front.

The housing may be made as one or more portions.

When the various outer surfaces of the strand fastener unit, in particular the outer peripheral surfaces of the contacts, are made of insulating material, the chamber for the fastener units may be made of conductive material, e.g. of metal; the housing may for example be made as a single metal part, e.g. in particular by machining. This may apply for example if the contacts present respective insulating outside sheaths.

Conversely, when the outsides of the contacts are made of conductive material, in particular of metal, and more particularly when a signal or energy is transmitted by that material, the contacts need to be electrically insulated from one another inside the connector. Under such circumstances, the chamber is preferably made of electrically insulating material, e.g. of plastics material (polymer or otherwise).

The housing may then for example be formed by an insulating insert placed inside an outer metal shell. Otherwise, it may optionally be made entirely out of plastics material.

At least the first and second strand fastener units are mounted in the housing by means of the bayonet couplings provided in this purpose.

A bayonet coupling is a specific configuration or arrangement of two parts enabling them to be assembled together by performing two movements, namely a movement in translation of one part relative to the other, followed by a movement in rotation of one part relative to the other.

A bayonet connection can also be called a "quarter-turn" connection. The term "quarter-turn" does not imply in any way herein that the rotation is equal exactly to one-fourth of a turn. The movement in rotation may be through an angle lying in the range 20° to 45°, for example.

It should be understood that in the connector, due to the bayonet couplings, each of the first and second strand fastener unit is configured to be mounted by inserting the strand fastener unit axially in the opening of the housing until a certain predetermined axial position, and then by causing the sleeve to rotate around the axis of the strand fastener unit.

The purpose and effect of mounting the fastener unit at least in part in the internal chamber of the housing is to fasten the fastener unit to the housing. For security purposes, additional means may be provided to ensure that the fastener unit remains durably in the desired mounted position and does not become disassembled over time.

For this purpose, in an embodiment, the connector includes for at least one of said first and second strand fastener units, a snap (or click) mechanism enabling the strand fastener unit to be locked in the mounted position at the end of assembling, and thus enabling it to be held in a position that is stationary relative to the housing. Snap (or click) fastening is a technique for assembling together two portions by engaging them with elastic deformation (generally localized deformation, e.g. of a tongue, or by deformation of all of one of the parts being assembled together). Once the two parts are engaged in the snap-fastened position, they have generally returned to their initial shape and are no longer elastically deformed (or are elastically deformed to a smaller extent). When the two parts are engaged with each other in the snap-fastened position, they co-operate with each other so as to oppose, or indeed block, relative movements of said parts in a separation direction (direction opposite to the engagement direction).

Thus, by way of example, in an embodiment, each of the first and second strand fastener units is configured to be mounted in the housing by inserting the strand fastener unit in the opening of the housing until it reaches a first axial position, then by turning the sleeve about the axis of the fastener unit, and then by releasing the sleeve, the strand fastener unit thus becoming axially blocked relative to the housing under the action of return means. By way of example, the return means may be a spring.

Furthermore, at the end of the mounting, the housing and the sleeve may be arranged in various different manners in order to ensure that the strand fastener unit is fastened to the housing.

Preferably, and in particular for connections by movements in rotation and in translation, provision may be made for a first holder to block all degrees of freedom of the sleeve to move relative to the housing, other than movement in translation along the axis of the fastener unit and movement in rotation about that axis, together with second and third holders (or blocking structures) for blocking the sleeve respectively against movement in translation along the insertion direction and against movement in rotation about that axis.

In order to provide the first holder, in one embodiment, for each of said first and second strand fastener units:

the bayonet coupling includes at least one guide surface formed in the housing; and the strand fastener unit and the housing are arranged in such a manner that when the strand fastener unit is mounted at least in part in the internal chamber of the housing, said at least one guide surface co-operates with the sleeve so as to block all degrees of freedom of the sleeve to move other than movement in translation along the axis of the fastener unit and movement in rotation about that axis. The guide surface(s) thus constitute(s) the first holder. The guide surface(s) may in particular be surfaces of a cylinder having a circular base.

In this embodiment, for each strand fastener unit, the strand is fastened to a large extent by the guide surfaces. Typically, the sleeve is of cylindrical outside shape. The guide surface(s) is/are of shape that is likewise cylindrical and of diameter that is not less than the diameter of the sleeve, thus making it possible to ensure that the sleeve is arranged coaxially relative to the guide surfaces, thereby ensuring that the sleeve is held in position (apart from moving axially in translation and in rotation relative to the axis of the fastener unit).

A particular feature of the connector of the disclosure is that, unlike the above-described connector, at least for the two strand fastener units, the contacts are configured so as to be mounted along the insertion direction by passing through the same opening in the rear face of the housing. In the embodiment described above, in which the housing presents one or more guide surfaces, at least for said first and second strand fastener units, said at least one guide surface of the strand fastener unit under consideration preferably extends axially at said at least one guide surface over only a portion of the periphery of the sleeve and leaves portions of the sleeves of the first and second strand fastener units that are closest to each other directly facing each other.

This arrangement makes it possible to position the contacts of the first and second strand fastener units very close to each other within the chamber of the housing. Because of this arrangement, the pitch of the two fastener units in the mounted position can be reduced to a minimum; in particular, the sleeves of the two fastener units in the mounted position may be separated by only a very small distance; there is no need to provide some minimum distance as would be necessary if a wall of the housing were required to lie between two sleeves.

The pitch of the first and second strand fastener units may consequently be less than 1.5 times or even less than 1.2 times the outside diameter of a sleeve (which outside diameter relates to the portion of the sleeve that is inside the housing in the mounted position and that co-operates with the guide surfaces. The sleeve may have a portion situated outside the housing in the mounted position; this portion may be of arbitrary shape, and in particular it could be of a shape that is not cylindrical).

In an embodiment of the disclosure, when looking in the insertion direction, for at least one of said strand fastener units, said at least one guide surface extends (optionally extends only) over two mutually opposite angular sectors.

Preferably, these angular sectors are oriented in directions that are generally perpendicular or oblique relative to the straight line passing through the axes of the first and second strand fastener units. Such an embodiment is selected in particular when the connector has three strand fastener units, and when the three strand fastener units are placed immediately one beside another (aligned) in the mounted position. For the strand fastener unit placed between the other two (in the mounted position), the housing then presents exactly two guide surfaces situated facing each other and between which the sleeve is to be found in the mounted position.

Furthermore, in order to block the contact axially in the housing, the connector may be arranged in various ways.

The second holder may in particular comprise a spring that forms a snap mechanism. In addition to the guide surface(s), the strand fastener unit is then fastened by co-operation between the housing, the spring, and the contact with the sleeve. The spring is generally of the helical type and is then placed around the end of the strand. In an embodiment, the spring is arranged, at least in part and optionally entirely, inside the sleeve when the fastener unit is in the mounted position.

The spring is used in compression. In the mounted position, it applies opposite forces respectively against the housing and against the contact, thereby causing the contact to be pushed forwards (i.e. in the insertion direction) relative to the housing. The housing is arranged so as to block axial movement of the contact.

Thus, in an embodiment, for at least one of said first and second strand fastener units:

the snap mechanism includes a spring;

the contact is configured so that after being fastened to the end of the strand previously passed through the sleeve, it can be assembled in an insertion direction along the axis of the fastener unit by passing through the opening in the rear face of the housing; and the strand fastener unit and the housing are arranged in such a manner that when the strand fastener unit is in the mounted position, the spring is compressed, and, by bearing against the housing, it bears against the contact in the insertion direction, and consequently blocks the contact against moving relative to the housing in the insertion direction.

In order to enable the spring to bear against the contact in the insertion direction, in one embodiment the contact presents a spring-bearing surface of the contact arranged in such a manner that the spring arranged around the end of the strand can apply a compression force to the spring-bearing surface of the contact in an axial direction of the contact. In particular, in an embodiment, for at least one contact fastener unit, the contact has an outside shape that is substantially cylindrical, and the bearing surface of the spring of the contact is formed on an outer flange of the contact.

Furthermore, concerning the bearing of the spring against the housing, this may either be direct (the spring is in contact with the housing) or else indirect. If it is indirect, then by way of example the spring may bear against the sleeve, and it is the sleeve that bears against the housing. In order to make such bearing possible, in an embodiment, the sleeve presents a spring-bearing surface of the sleeve arranged in such a manner that the spring arranged around the end of the strand can apply a compression force to the spring-bearing surface of the sleeve in an axial direction thereof.

For this purpose, in an embodiment, the sleeve presents a cylindrical inside bore and the spring-bearing surface of the sleeve is formed by a shoulder arranged in the bore.

It should be observed that in certain embodiments, the connector blocks the contact axially in two different ways depending on whether or not it is connected with a corresponding "second" connector.

When blocking in a first way, in the absence of the above-mentioned "second" connector, it is the housing itself that blocks the contact in the forward direction, by opposing the force applied to the contact by the spring. (The contact becomes blocked forwards against a surface of the housing.)

Conversely, when the connector (assumed to be a first connector) is fastened to the second connector, the contacts are blocked axially forwards in a different manner: the contacts of the first connector and of the second connector are then mutually engaged. Advantageously, in this position, each of the contacts of the first and second connectors is then blocked axially, not by the housing blocking the contact, but rather by the contacts of the second connector coming into contact with the first connector. The springs of the contact fastener units then serve to maintain the contacts of the first connector permanently in contact with the contact of the second connector. This serves advantageously to establish very good quality contact between the contacts of the first and second connectors. Contact is then contact as a function of the integrated spring.

In an embodiment of the connector of the disclosure, the force applied by the spring rearwards on the housing is transmitted via the sleeve: the rear portion of the spring exerts a rearward force on the sleeve and the sleeve in turn exerts that force on the housing. The sleeve must thus be capable of transmitting this force to the housing.

For this purpose, in a preferred embodiment, the sleeve presents at least one axial blocking lug projecting from its outside surface; and the housing and the strand fastener unit in question are configured in such a manner that in the mounted position, under the effect of pressure from the spring, the sleeve is pushed rearwards into the mounted position in which said at least one axial blocking lug bears against at least one sleeve axial blocking surface of the housing, thereby blocking said at least one axial blocking lug in the rearward direction and thus preventing any movement of the sleeve towards the rear.

In a preferred variant, the sleeve of the strand fastener unit under consideration and the housing are configured in such a manner that:

the sleeve, when placed in a first angular position, can be inserted into the chamber of the housing in the insertion direction, and then the sleeve can be caused to turn about the axis of the fastener unit in order to reach a second angular position in which said at least one sleeve axial blocking surface of the housing blocks said at least one axial blocking lug in the rearward direction.

Preferably, and at least for the strand fastener unit under consideration, the sleeve of the strand fastener unit under consideration and the housing are configured in such a manner that:

the sleeve of the strand fastener unit under consideration, placed in a first angular position, can be inserted (at least in part) inside the chamber of the housing along the insertion direction (it then reaches the first axial position); and then the sleeve can be caused to turn about the axis of the fastener unit so as to reach a second angular position in which a sleeve axial blocking surface of the housing blocks said at least one axial blocking lug (and consequently the sleeve) in a rearward direction, and thus prevents any movement of the sleeve towards the rear.

Finally, in order to block the sleeve against moving in rotation relative to the housing, it is preferable also to provide the above-mentioned third holder.

For this purpose, in an embodiment, at least for a strand fastener unit under consideration, the sleeve of the strand fastener unit under consideration and the housing are configured in such a manner that:

the housing presents at least one turning-blocking surface that is not a surface of revolution about the insertion direction; and the sleeve presents at least one anti-turning lug projecting from its outside surface.

Furthermore, the strand fastener unit under consideration and the housing are then arranged in such a manner that while mounting the strand fastener unit under consideration at least in part inside the internal chamber of the housing:

the strand fastener unit is inserted into the chamber of the housing in the insertion direction via the opening of the housing until the sleeve axially reaches a first axial position and angularly reaches a first angular position; then the sleeve turns about the axis of the fastener unit to reach a second angular position;

the sleeve then slides axially relative to the housing to reach a second axial position situated to the rear of the first axial position; and when the sleeve is in the second axial position, the anti-turning lug co-operates with said at least one turning-blocking surface so as to prevent the sleeve from turning about the axis of the fastener unit.

Finally, the connector may advantageously present visual markers (one marker for each strand fastener unit) in order to ensure that the various strands are properly fastened to the housing.

Thus, in an embodiment, at least for the strand fastener unit under consideration, the sleeve includes a marker, the strand fastener unit and the sleeve being configured in such a manner that when the sleeve is in the first axial position, the marker is not visible at the rear of the housing, whereas when the sleeve is in the second axial position, the marker is visible, and preferably projects beyond, the rear of the housing. The marker indicates proper fastening and proves to the operator in charge of fastening the various strands that the sleeve is indeed in the mounted position, and thus that the strand is suitably fastened.

By way of example, the marker may be a color marker and/or a projection arranged on the outside surface of the sleeve, a color marker provided on the outside surface of the sleeve, and/or a projection arranged on said surface.

Advantageously, the sleeve and the housing may be configured in such a manner that the marker projects rearwards (and not radially) when the sleeve is in the mounted position. Thus, the radially outer surface of the housing does not need to have a radial passage in order to verify that the sleeve is properly positioned. Consequently, this avoids weakening the housing mechanically by the presence of such a radial passage.

In addition, the marker may be made in the form of an axial spline, in particular of cylindrical outside shape. Furthermore, the inside surfaces of the chamber shaped to co-operate with the axial blocking lugs may also be in the form of cylindrical surfaces. Consequently, the inside surface of the housing can be machined in particularly simple manner, e.g. using shell end mills, with the tools following simple paths.

BRIEF DESCRIPTION OF THE DRAWINGS

The disclosure can be well understood and its advantages appear better on reading the following detailed description of an embodiment given by way of a non-limiting example. The description refers to the accompanying drawings, in which:

FIGS. 3A and 3B are section views of the FIG. 1 connector in a plane perpendicular to the insertion direction, immediately after inserting the strand fastener units in the housing and before turning the sleeve; FIG. 3A is a view towards the rear, while FIG. 3B is a view towards the front;

DETAILED DESCRIPTION OF THE DISCLOSURE

With reference to the various figures, a connector 10 constituting an embodiment of the disclosure is described below.

The connector 10 comprises a housing 20 and four strand fastener units 30A, 30B, 30C, and 30D that are identical to one another. Each strand fastener unit comprises a contact (32A, 32B, 32C, 32D), a spring (34A, 34B, 34C, 34D), and a sleeve (36A, 36B, 36C, 36D).

Below, and by way of convention, the letters A, B, C, and D placed after a reference numeral designate the same component, but respectively for the first, second, third, or fourth strand fastener unit. The numerical reference on its own then designates all four components: for example the sleeves 36.

Figure 2:
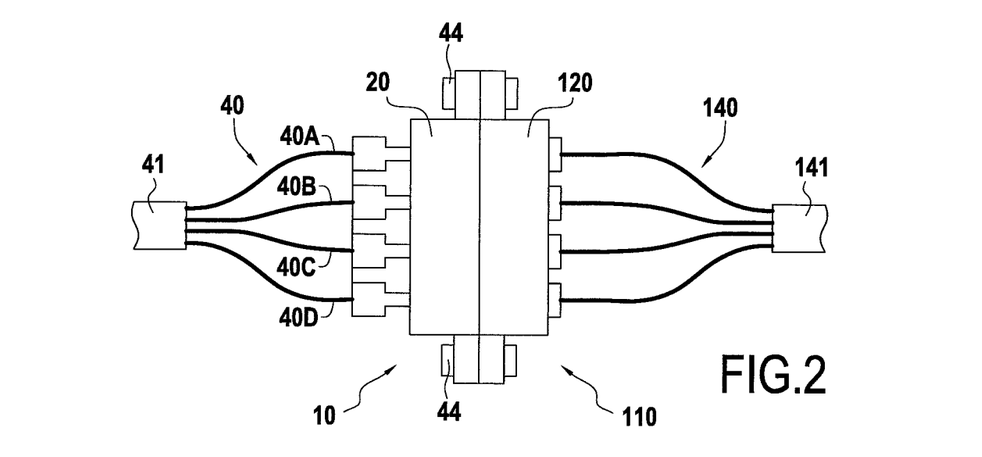
FIG. 2 is a plan view of the FIG. 1 connector, connected to a corresponding second connector.

The connector 10 constitutes a first connector designed to be fastened to a corresponding second connector 110 (FIG. 2). The connector 10 is suitable for connecting to four strands 40. When the connector 110 is in turn connected to four strands 140, the connectors 10 and 110 together enable the four strands 40 to be connected to the four strands 140 in parallel. The strands 40 are assembled together in a sheath 41, remote from the connector 10; the strands 140 are assembled in a sheath 141 remote from the connector 110. The housing 20 is fastened to the housing 120 by screws 44.

A relatively major difference between the connector 10 and the connector 110 is that the contacts in the connector 10 are contacts each having an "integral spring function", whereas on the contrary the contacts in the connector 110 are stationary, i.e. they are held in a position that is stationary relative to the housing 120.

Figure 3A:
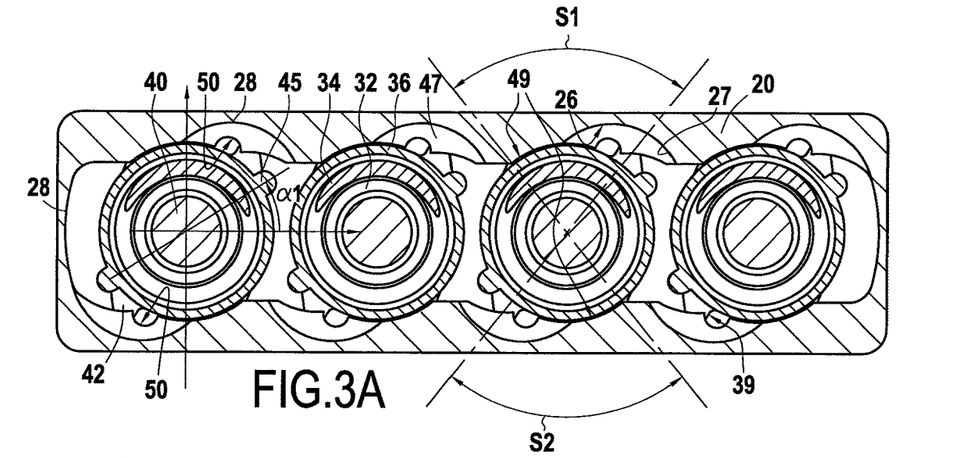
Figure 3B:
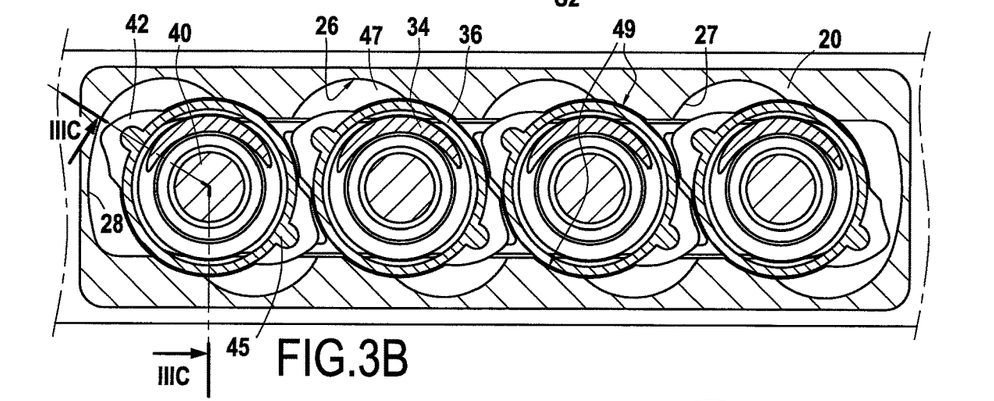
Figure 3C:
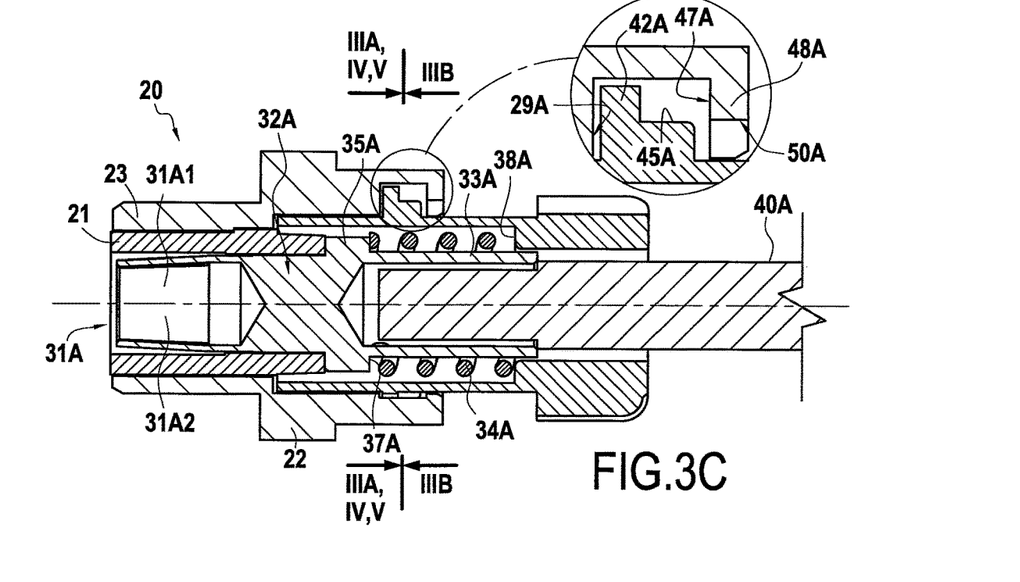
FIG. 3C is a longitudinal section view of the FIG. 1 connector, at the mounting step shown in FIGS. 3A and 3B.

The housing 20 is a housing made of two portions. It includes an insert 21 made of injected and/or machined plastics material placed inside an aluminum shell 23 made by machining (FIG. 3). It presents a platform 22, with two screws 44 passing through its ends for the purpose of fastening the connector 10 to the connector 110.

Apart from the platform 22, the housing 20 is generally in the shape of a rectangular parallelepiped arranged between a front face 24 and a rear face 25. The rear face 25 is pierced by a large opening for passing the fastener units 30.

Since the four fastener units 30 are identical, the connector 10 is described solely with reference to the assembly 30A.

Figure 1:
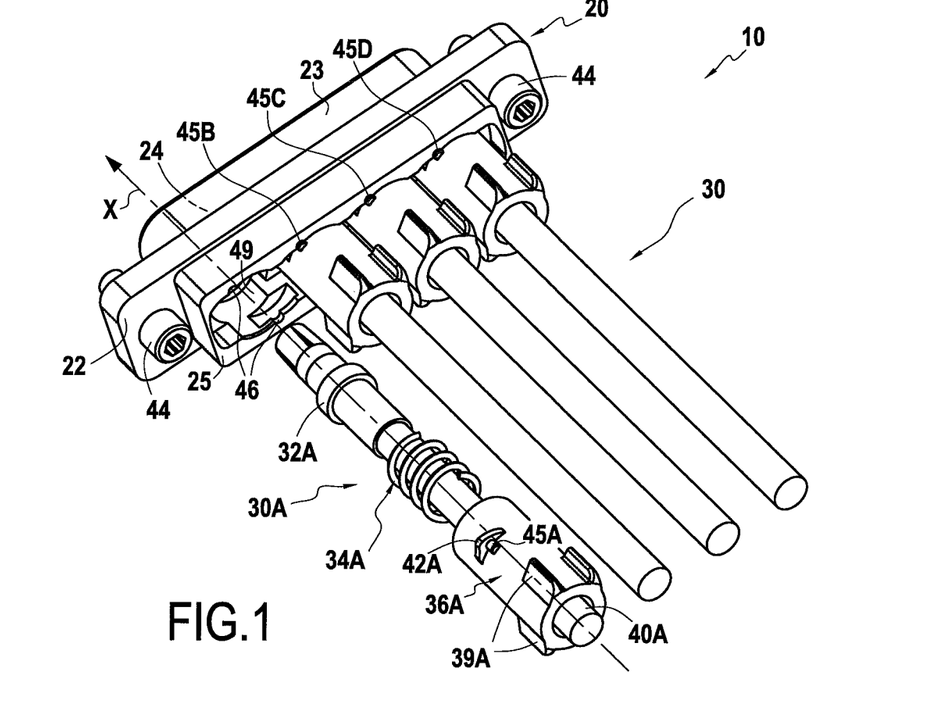
FIG. 1 is a diagrammatic perspective view of an embodiment of a connector of the disclosure.

The strand fastener unit 30A includes the contact 32A, the spring 34A, and the sleeve 36A (FIGS. 1, 3). It serves to fasten the strand 40A to the housing 20.

In the example shown, the strand 40A is constituted by a single electrical conductor made of copper. The contact 32A is a contact that is likewise made of copper, by turning, and it is crimped onto the end of the strand 40A.

The front face 31A of the contact 32A is formed with four tongues 31A1, 31A2, 31A3, 31A4, each designed to be inserted inside a corresponding contact of the connector 110.

The rear end 33A of the contact 32A is in the form of a sleeve, i.e. a hollow cylinder. The inside bore is occupied by the end of the strand 40A, this cylindrical portion 33A specifically being crimped onto the end of the strand. The spring 34A is arranged around the cylinder 33A.

At approximately equal distances from its ends, the contact 32A presents a flange 35A. On its rear side, the flange presents a surface 37A from which the normal extends rearwards. This surface constitutes a bearing surface for the contact spring: the front end of the spring 34A bears thereagainst.

By definition, the sleeve 36A is generally in the form of a hollow cylinder. The inside bore passing through it in the insertion direction (in the mounted position) presents a first portion of diameter that is slightly greater than the outside diameter of the spring 34A, and that serves specifically to receive the spring 34A. Further towards the rear, this bore portion of larger diameter is extended towards a bore portion of smaller diameter, of diameter that serves merely to allow the strand 40A to pass through with clearance.

At the change in diameter in the inside bore in the sleeve 36A, there is formed a spring-bearing surface 38A against which the rear end of the spring 34A bears.

The outside surface of the sleeve 36A is shown in particular in FIG. 1. At its rear end, it includes fins 39A that serve to hold the sleeve, and in particular that enable it to be turned while it is being put into place, as described below.

Furthermore, at about one-third of the way from its front end, the outside surface of the sleeve 36A includes two axial blocking lugs 42.

These lugs project from the outside surface of the sleeve 36A. They serve to prevent the sleeve moving axially towards the rear relative to the housing 20 as follows.

Firstly it is necessary to describe the shape of the chamber 26 and of its opening. Seen from the rear, the shape of the opening is defined by its outline 27.

The chamber 26 is arranged so as to receive (in part) the contact fastener units 30. It serves in particular to hold the cylindrical portions of the sleeves 36 by blocking all degrees of freedom of the sleeves to move, with the exception of movement in translation along the axis of the fastener unit forming a part thereof, and movement in rotation about that axis. This holding is performed by cylindrical surfaces 49 arranged in the chamber 26 that constitutes guide surfaces in the meaning of the disclosure.

These guide surfaces 49 extend over two angular sectors S1 and S2 that are generally opposite each other (FIG. 3A).

The diameter of the guide surfaces 49 is determined so that the four sleeves 36 can pass into the outline 27 in order to be inserted in the chamber 26.

Furthermore, in the angular position of the sleeves 36 that is to be used for inserting the sleeves (shown in FIGS. 3A, 3B, and 3C), it is necessary for the lugs 42 to be capable of penetrating into the chamber 26. For this purpose, and for each assembly 30, the outline 27 includes two projecting portions 28 (mostly of circularly arcuate shape) that project outwards so as to allow the lugs 42 to pass. The inside of the chamber 26 is designed so that the lugs 42 can penetrate into the inside of the chamber while a strand fastener unit 30 is being mounted in the housing 20.

Because of the way the housing 20 and the fastener units 30 are arranged, the fastener units are coupled to the housing by a bayonet type coupling.

A strand fastener unit 30, e.g. the assembly 30A is mounted in the connector 10 by performing the following operations.

In a first step (FIGS. 3A, 3B, and 3C), the strand fastener unit 30A is moved in translation along the insertion direction until the sleeve reaches a first insertion position in which the lugs 42A come into abutment against a surface 29A of the housing. Throughout this movement in translation, the sleeve remains in the insertion angular position. In this position, the lug 42A forms an angle $\alpha 1$ relative to the horizontal direction, as shown in FIG. 3A.

Figure 4:
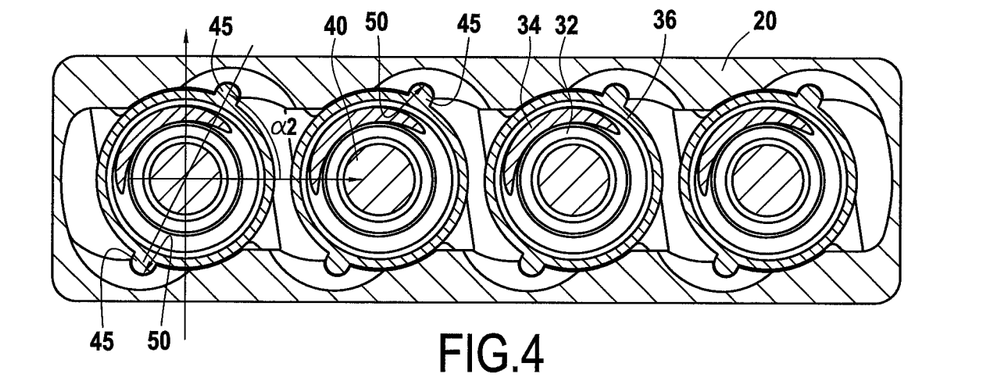
FIG. 4 is a section view of the FIG. 1 connector in a plane perpendicular to the insertion direction, looking towards the rear, after inserting the strand fastener units in the housing and after turning the sleeves, but before releasing them.

In a second step, the sleeve 36 is turned by hand until it reaches the final angular position, shown in FIG. 4 (angle $\alpha 2$). This turning movement is blocked when the lugs 42A come into abutment against the inside wall of the chamber 26 (arrow A, FIG. 5). After turning in this way, the lugs 42A, when seen from the rear direction, are to be found at least in part behind a portion 48 situated at the rear 25 of the housing 20 and facing a portion of the surface 29A.

Figure 5:
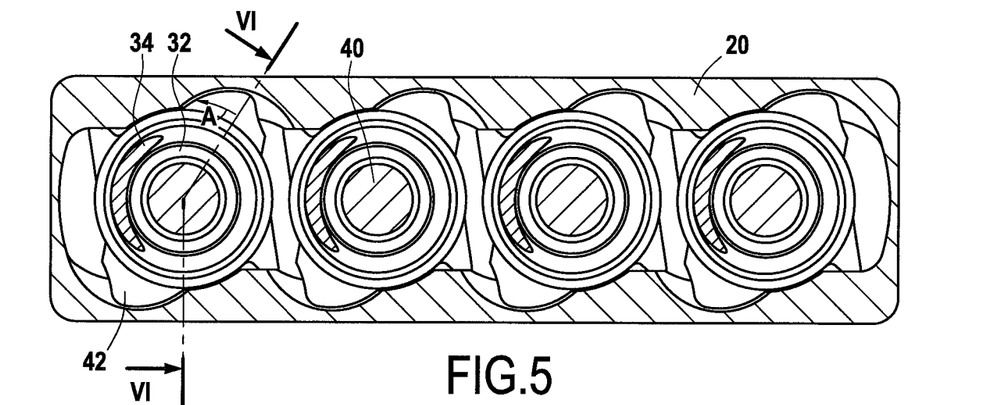
FIG. 5 is a section view of the FIG. 1 connector in a plane perpendicular to the insertion direction, looking towards the rear, after inserting the strand fastener unit in the housing, after turning the sleeves, and after releasing them; the connector is thus in the mounted position.
Figure 6:
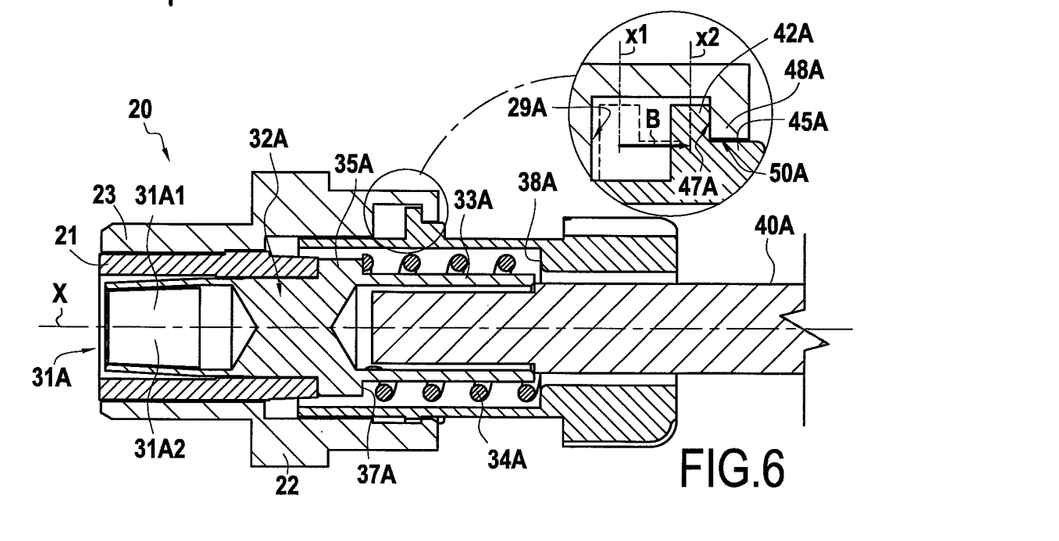
FIG. 6 is a longitudinal section view of the FIG. 1 connector in the mounted position.

When the connector 10 is in the mounted position, this portion 48 of the housing 20 serves to prevent the sleeve 36 from moving in reverse, as explained below with reference to FIGS. 5 and 6.

Specifically, the connector 10 has a snap mechanism that holds the fastener unit 30 in the mounted position. This snap mechanisms is constituted mainly by the spring 34 and by the various surfaces and structures that transmit the return force: namely, the bearing surface of the spring 34 acting forwards against the contact 32; and the bearing surfaces 38 formed on the sleeve, and the axial blocking lugs 42 of the sleeve 36, co-operating with a portion 48 of the housing 20, together acting rearwards.

At the end of mounting the strand fastener unit, a locking step (FIGS. 5 and 6) serves to place the strand fastener unit in the mounted position and provide the sleeve 36 both with axial blocking and with blocking against turning, as follows.

In addition to the lugs 42A, the sleeve 36A has markers 45A. In this embodiment, these markers are constituted by short axial splines projecting from the outside surface of the sleeve 36A. These axial splines or markers 45A extend rearwards from the lugs 42A. In particular, when seen from the rear (as in FIG. 1) these markers 45A lie inside the surface occupied by the lugs 42A.

During the first step of assembling the connector 10, these markers 45A are assembled in full inside the chamber 26.

The chamber 26 is provided with grooves 50 arranged to allow the markers 45 to pass as follows.

During the locking step, the sleeve 36A is released. Since the spring 34A is exerting a rearward force on the sleeve 36A, it moves rearwards until the lugs 42A become blocked against a sleeve axial blocking surface provided inside the chamber 26 on the portion 48 (FIG. 6). The sleeve 36A is then blocked axially in its final axial position (mounted position). Because of this rearward movement (arrow B in the detail view of FIG. 6), the markers 45A, which were previously entirely inside the housing 20, project a little therefrom, as can be seen for the markers 45B, 45C, and 45D in FIG. 1. The operator who is mounting the strand fastener unit 30A can thus verify that the sleeve 36A that has just been mounted is properly positioned.

The markers 45 serve not only to provide an assembly indicator function, but also a function of preventing movement in rotation. Specifically, during reverse movement of the sleeve 36A in order to reach its final axial position, the markers 45A become inserted in the corresponding grooves 50 formed inside the chamber 26 for receiving them. These grooves fit (with clearance) around the outside shape of the markers 45A, and consequently they prevent any movement of rotation of the sleeve 36A. The sleeve 36A is thus prevented from turning, e.g. under the influence of vibration, so it cannot return to the angular position reached at the end of the first mounting step (angle α1) in which position the sleeve 36A might possibly escape from the chamber 26.

The various figures show clearly the compact nature of the connector 10. As can be seen, the fastener units 30 are all inserted via a single opening that is defined in the rear face 25 of the chamber 26 by its outline 27. For each adjacent pair of sleeves 36, the portions of the sleeves 36 that are the closest to each other face each other directly, i.e. more precisely they are not separated by any partition in the housing 20. As a result, the pitch d of the sleeve 36 can be reduced to a value that is very small, in particular a value that is less than 1.2 D, where D is the outside diameter of the sleeves 36.

Although the present disclosure is described with reference to a specific embodiment, it is clear that various modifications and changes may be made relative of that embodiment without going beyond the general ambit of the disclosure as defined by the claims. Consequently, the description and the drawings should be considered in a sense that is illustrative rather than restrictive.

The invention claimed is:

1. A connector comprising a housing and at least a first strand fastener unit and a second strand fastener unit, wherein:
the housing presents an internal chamber opening out via a first opening in a rear face of the housing;
each of said first and second strand fastener units presents an axis and includes a contact and a sleeve, said contact being configured to be fastened to one end of a strand that has previously been passed through the sleeve;
the connector presents, for each of said first and second strand fastener units, a bayonet coupling enabling at least part of the strand fastener unit to be mounted inside the internal chamber of the housing; and
the housing and said first and second strand fastener units are configured in such a manner that during said mounting said first and second strand fastener units are each inserted into said first opening into the housing.

2. A connector according to claim 1, wherein, for each of said first and second strand fastener units:
the bayonet coupling includes at least one guide surface formed in the housing; and
the strand fastener unit and the housing are arranged in such a manner that when the strand fastener unit is mounted at least in part in the internal chamber of the housing, said at least one guide surface co-operates with the sleeve so as to block all degrees of freedom of the sleeve to move other than movement in translation along the axis of the fastener unit and movement in rotation about that axis.

3. A connector according to claim 2, wherein, for each of said first and second strand fastener units, said strand fastener unit under consideration extends axially at said at least one guide surface formed in said housing over only a portion of the periphery of the sleeve and leaves portions of the sleeves of the first and second strand fastener units that are closest to each other directly facing each other.

4. A connector according to claim 2, wherein, when looking in the insertion direction, for at least one of said strand fastener units, said at least one guide surface extends over two mutually opposite angular sectors.

5. A connector according to claim 1, including, for at least one of said first and second strand fastener units, a snap mechanism enabling the strand fastener unit to be locked in the mounted position at the end of mounting, and thus enabling it to be held in a position that is stationary relative to the housing.

6. A connector according to claim 5, wherein, for at least one of said first and second strand fastener units:
the snap mechanism includes a spring;
the contact is configured so that after being fastened to the end of the strand previously passed through the sleeve, it can then be mounted in an insertion direction along the axis of the fastener unit by passing through the opening in the rear face of the housing; and
the strand fastener unit and the housing are arranged in such a manner that when the strand fastener unit is in the mounted position, the spring is compressed, and, by bearing against the housing, it bears against the contact in the insertion direction, and consequently blocks the contact against moving relative to the housing in the insertion direction.

7. A connector according to claim 6, wherein the contact presents a spring-bearing surface of the contact arranged in such a manner that the spring arranged around the end of the strand can apply a compression force to the spring-bearing surface of the contact in an axial direction thereof.

8. A connector according to claim 6, wherein:
the sleeve presents at least one axial blocking lug projecting from its outside surface; and
the housing and the strand fastener unit in question are configured in such a manner that in the mounted position, under the effect of pressure from the spring, the sleeve is pushed rearwards into the mounted position in which said at least one axial blocking lug bears against at least one sleeve axial blocking surface of the housing, thereby blocking said at least one axial blocking lug in the rearward direction and thus preventing any movement of the sleeve towards the rear.

9. A connector according to claim 8, wherein the sleeve of the strand fastener unit under consideration and the housing are configured in such a manner that:
the sleeve of the strand fastener unit under consideration, when placed in a first angular position, can be inserted into the chamber of the housing in the insertion direction, and then
the sleeve can be caused to turn about the axis of the fastener unit in order to reach a second angular position in which said at least one sleeve axial blocking surface of the housing blocks said at least one axial blocking lug in the rearward direction.

10. A connector according to claim 1, wherein, at least for a strand fastener unit under consideration, the sleeve of the strand fastener unit under consideration and the housing are configured in such a manner that:
the housing presents at least one turning-blocking surface that is not a surface of revolution about the insertion direction; and
the sleeve presents at least one anti-turning lug projecting from its outside surface; and
the strand fastener unit under consideration and the housing are arranged in such a manner that while mounting the strand fastener unit under consideration at least in part in the internal chamber of the housing:
the strand fastener unit is inserted into the chamber of the housing in the insertion direction via the opening of the housing until the sleeve axially reaches a first axial position and angularly reaches a first angular position; then
the sleeve turns about the axis of the fastener unit to reach a second angular position;
the sleeve then slides axially relative to the housing to reach a second axial position situated to the rear of the first axial position; and
when the sleeve is in the second axial position, the anti-turning lug co-operates with said at least one turning-blocking surface so as to prevent the sleeve from turning about the axis of the fastener unit.

11. A connector comprising a housing and at least a first strand fastener unit and a second strand fastener unit, wherein:
the housing presents an internal chamber opening out via a single opening in a rear face of the housing;
wherein each of said first and second strand fastener units presents an axis and includes a contact and a sleeve, said contact being configured to be fastened to one end of a strand that has previously been passed through the sleeve; and
the housing and said first and second strand fastener units are configured in such a manner that during said mounting said first and second strand fastener units are each inserted into said single opening into the housing.

12. A connector according to claim 11, wherein, for each of said first and second strand fastener units:
said connector comprises a bayonet coupling enabling at least part of the strand fastener unit to be mounted inside the internal chamber of the housing, said bayonet coupling comprising at least one guide surface formed in the housing; and
the strand fastener unit and the housing are arranged in such a manner that when the strand fastener unit is mounted at least in part in the internal chamber of the housing, said at least one guide surface co-operates with the sleeve so as to block all degrees of freedom of the sleeve to move other than movement in translation along the axis of the fastener unit and movement in rotation about that axis.

13. A connector according to claim 12, wherein, for each of said first and second strand fastener units, the strand fastener unit under consideration extends axially at said at least one guide surface formed in said housing over only a portion of the periphery of the sleeve and leaves portions of the sleeves of the first and second strand fastener units that are closest to each other directly facing each other.

14. A connector according to claim 12, wherein, when looking in the insertion direction, for at least one of said strand fastener units, said at least one guide surface extends over two mutually opposite angular sectors.

15. A connector according to claim 11, including, for at least one of said first and second strand fastener units, a snap mechanism enabling the strand fastener unit to be locked in the mounted position at the end of mounting, and thus enabling it to be held in a position that is stationary relative to the housing.

16. A connector according to claim 15, wherein, for at least one of said first and second strand fastener units:
the snap mechanism includes a spring;
the contact is configured so that after being fastened to the end of the strand previously passed through the sleeve, it can then be mounted in an insertion direction along the axis of the fastener unit by passing through the opening in the rear face of the housing; and
the strand fastener unit and the housing are arranged in such a manner that when the strand fastener unit is in the mounted position, the spring is compressed, and, by bearing against the housing, it bears against the contact in the insertion direction, and consequently blocks the contact against moving relative to the housing in the insertion direction.

17. A connector according to claim 16, wherein the contact presents a spring-bearing surface of the contact arranged in such a manner that the spring arranged around the end of the strand can apply a compression force to the spring-bearing surface of the contact in an axial direction thereof.

18. A connector according to claim 16, wherein:
the sleeve presents at least one axial blocking lug projecting from its outside surface; and
the housing and the strand fastener unit in question are configured in such a manner that in the mounted position, under the effect of pressure from the spring, the sleeve is pushed rearwards into the mounted position in which said at least one axial blocking lug bears against at least one sleeve axial blocking surface of the housing, thereby blocking said at least one axial blocking lug in the rearward direction and thus preventing any movement of the sleeve towards the rear.

19. A connector according to claim 18, wherein the sleeve of the strand fastener unit under consideration and the housing are configured in such a manner that:
the sleeve of the strand fastener unit under consideration, when placed in a first angular position, can be inserted into the chamber of the housing in the insertion direction, and then
the sleeve can be caused to turn about the axis of the fastener unit in order to reach a second angular position in which said at least one sleeve axial blocking surface of the housing blocks said at least one axial blocking lug in the rearward direction.

20. A connector according to claim 11, wherein, at least for a strand fastener unit under consideration, the sleeve of the strand fastener unit under consideration and the housing are configured in such a manner that:
the housing presents at least one turning-blocking surface that is not a surface of revolution about the insertion direction; and
the sleeve presents at least one anti-turning lug projecting from its outside surface; and
the strand fastener unit under consideration and the housing are arranged in such a manner that while mounting the strand fastener unit under consideration at least in part in the internal chamber of the housing:

the strand fastener unit is inserted into the chamber of the housing in the insertion direction via the opening of the housing until the sleeve axially reaches a first axial position and angularly reaches a first angular position; then the sleeve turns about the axis of the fastener unit to reach a second angular position;

the sleeve then slides axially relative to the housing to reach a second axial position situated to the rear of the first axial position; and when the sleeve is in the second axial position, the anti-turning lug co-operates with said at least one turning-blocking surface so as to prevent the sleeve from turning about the axis of the fastener unit.

* * * * *